UNITED STATES PATENT OFFICE.

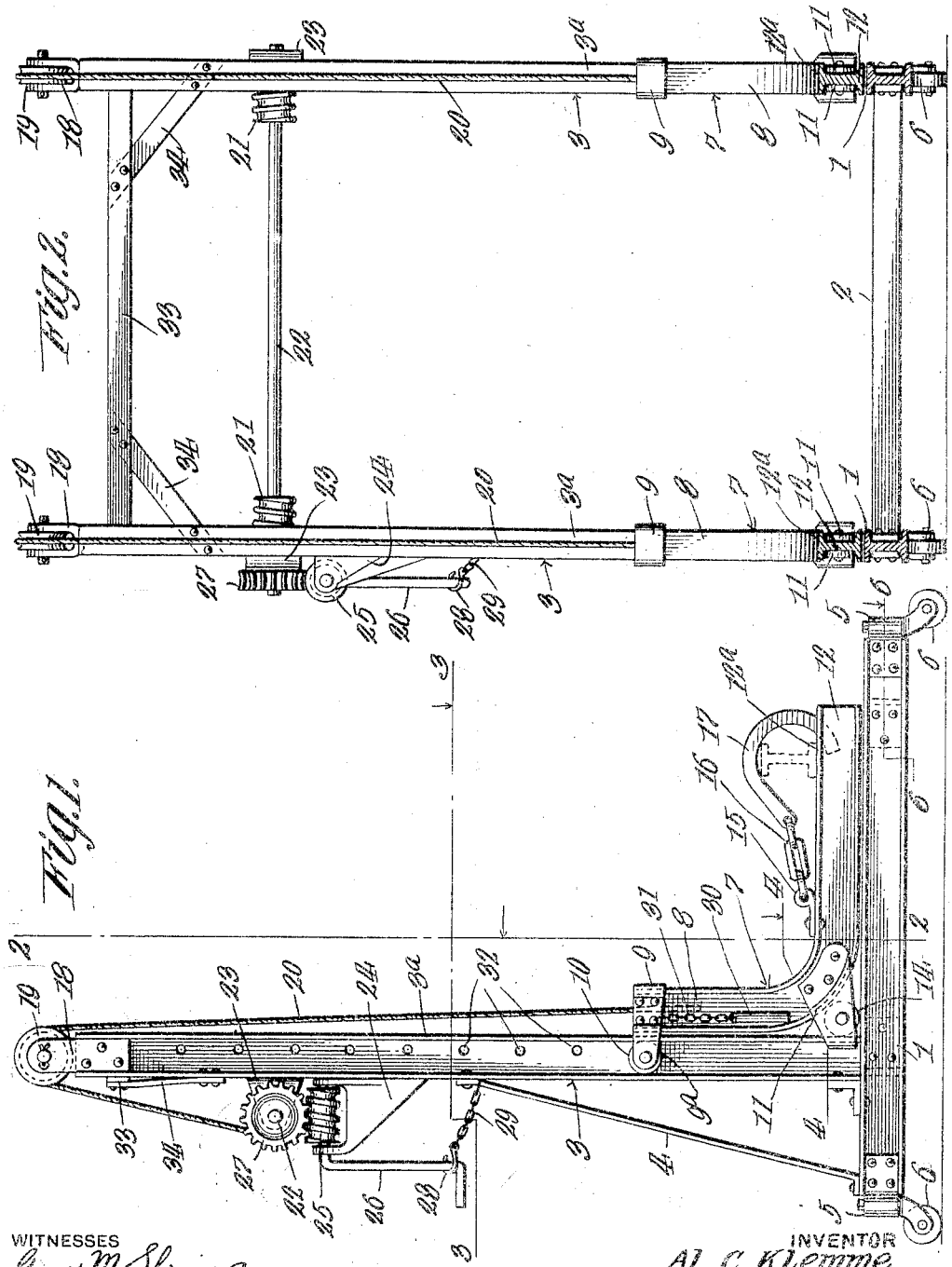

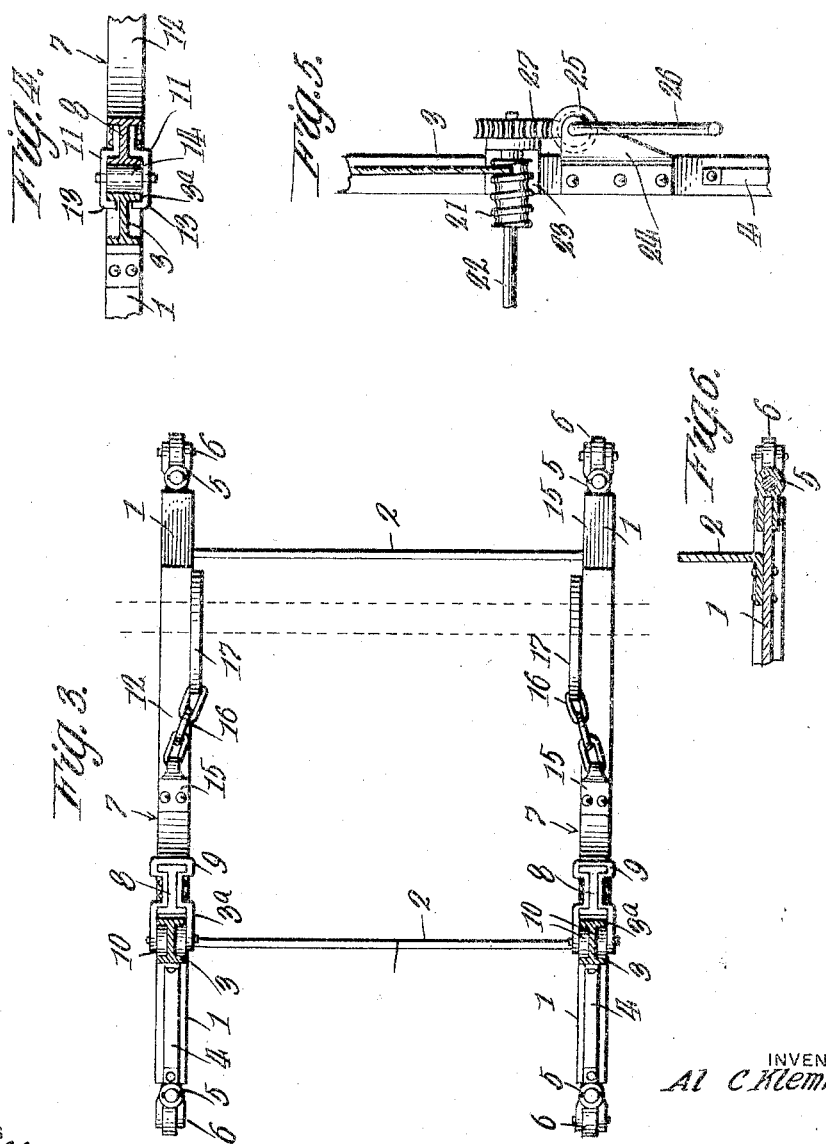

AL C. KLEMME, OF DAVENPORT, IOWA.

AUTOMOBILE-HOIST.

1,306,431. Specification of Letters Patent. Patented June 10, 1919.

Application filed February 27, 1918. Serial No. 219,451.

*To all whom it may concern:*

Be it known that I, AL C. KLEMME, a citizen of the United States, residing at Davenport, in the county of Scott and State of Iowa, have invented certain new and useful Improvements in Automobile-Hoists, of which the following is a specification.

This invention relates to automobile hoists, and more particularly to a hoist which is adapted to tilt an automobile at an inclination so as to permit ready access to the underneath thereof.

One of the main objects of the invention is to provide a hoist of simple construction and operation by means of which the front portion of an automobile may be lifted vertically to the desired height so as to expose the engine, transmission mechanism and associated parts. A further object is to provide a hoist of comparatively light, but strong and durable construction having standards, and a carriage vertically slidable thereon, means being provided and coöperating with carriage so as to raise the front portion of an automobile the front axle of which is secured on the carriage. A further object is to provide a hoist of very simple construction which is composed of a minimum of parts and may be produced at small cost. Further objects will appear from the detailed description.

In the drawings:

Figure 1 is a side view of a hoist constructed in accordance with my invention,

Fig. 2 is a section taken substantially on line 2—2 of Fig. 1,

Fig. 3 is a top plan view,

Fig. 4 is a section taken substantially on line 4—4 of Fig. 1,

Fig. 5 is a fragmentary detail of the mechanism for raising the carriage,

Fig. 6 is a section taken substantially on line 6—6 of Fig. 1.

This base of the frame is composed of the parallel I-beams 1 which are maintained in proper parallel spaced relation by the cross brace bars 2 having their ends rigidly secured to the web-portions of the beams. Standards 3 of I-beam construction are secured to beams 1 adjacent one end thereof, these standards being braced in vertical position by the brace rods 4 secured thereto and to the base beams. Each of the beams 1 is provided, at each end, with a sleeve 5 secured thereto which serves to support a caster 6, the base being thus mounted so as to permit the same to be easily removed into any desired position.

A substantially L-shaped carriage member 7 is mounted for vertical movement on each standard 3, these two members coöperating to provide a carriage which is adapted to receive the axle of a vehicle so as to elevate the same when the carriage is raised. The vertical arm 8 of this member is disposed in parallelism with, and closely adjacent, the inner face of standard 3. A U-bracket 9 is secured to the upper end of arm 8, the arms of this bracket projecting across the lateral faces of the standard so as to extend in front of the channels formed therein. Each arm $9^a$ of this bracket is provided with an anti-friction roller 10 which corresponds in diameter to the width of the channel in the lateral face of the standard, these rollers serving to guide the carriage member during its vertical movement and to prevent all looseness or play of the upper end thereof, relative to the standard. Bracket arms 11 are secured to member 7 approximately at the point of junction between the vertical arm 8 and the horizontal arm 12. These arms extend forwardly of the carriage across the inner flange $3^a$ of standard 3, and have their end portions turned inwardly at right angles to provide guide flanges 13 which fit about the edge portions of inner flange $3^a$. An anti-friction roller 14 is rotatably supported by these arms 11, this roller being of such diameter as to engage the outer face of flange $3^a$, the roller and the members 13 thus coöperating to effectually prevent all movement of the lower portion of member 7 toward or away from the standard, and eliminate all looseness or play. An eye-plate 15 is pivotally secured to the upper flange $12^a$ of arm 12 and receives the end link of a chain 16, the other end link of which is secured to the shank of a hook 17 which is directed inwardly and is adapted to engage about the axle of an automobile to be lifted, as indicated. By placing the hoist members beneath the front axle thereof, and then raising the carriage members so as to engage the under face of the axle and placing hooks 17 about the axle in the manner indicated, the front of the automobile will be lifted when the carriage is elevated so as to raise the automobile into an inclined position so as to permit ready access to the underneath thereof.

A fork 18 is secured to the upper end of each standard, and rotatably supports a grooved pulley 19. A cable 20 is passed over this pulley and is secured at one end to the upper end of vertical arm 8 of the carriage member 7. The other end of this cable is secured to a winding drum 21 secured on a shaft 22 rotatably supported on the standard by suitable bearing blocks 23. A supporting bracket 24 is secured on one of the standards and rotatably supports a worm 25 which is rotated by means of a crank 26 and meshes with a worm wheel 27 secured on the end of the shaft. By turning worm 25, rotation may be imparted to shaft 22 so as to wind the cables 20 onto the drums 21, thus lifting the carriage and elevating the front axle of the vehicle secured on the carriage members so as to lift the front of the vehicle for the purpose above set forth. When the vehicle has been raised, the desired distance, crank 26 may be secured against rotation by means of a hook 28 engaged about the same and secured to brace rod 4 by a short chain 29. If it is desired to relieve the cables and the winding mechanism of the strain incident to supporting the vehicle, this may be accomplished by inserting a stop pin 30 which is attached to bracket 9 by a chain 31 through any one of the openings 32 through the web portion of standard 3, beneath the roller 10 so as to positively prevent downward movement thereof. To eliminate spreading apart of the upper end of the standards, a suitable brace bar 33 is secured to the standards at each end, adjacent the upper end thereof, inclined braces 34 being secured to this brace and the standard.

This form of hoist is especially adapted for use with comparatively light automobiles where the vehicle may be raised directly by vertical movement of the supporting carriage without the necessity of employing great leverage. In this hoist, the carriage is raised directly vertically, thus permitting the vehicle to be raised quickly and in this manner effecting an appreciable saving of time in raising of the vehicle. By having all the frame work and the members of the carriage of I-beam construction I produce a comparatively light but very rigid and strong structure which is well adapted to withstand the strain to which it is subjected. The carriage members are free to move vertically of the standards, being secured against all play relative thereto, and the rollers 10 and 14 acting to maintain the carriage members in proper position and insure ease of operation thereof, roller 14 being positioned outside of the base flange $3^a$ of the standards acting as a fulcrum member and insuring that rollers 10 are held tightly against the inner face of this flange so as to insure accurate operation of the carriage member.

It will be evident that there may be slight changes made in the construction and arrangement of the details of my invention without departing from the field and scope of the same, and I intend to include all such variations, as fall within the scope of the appended claim, in this application in which a preferred form only of my invention is disclosed.

What I claim is:

In hoists, a base frame, vertical standards secured thereto, each having an inner vertical flange, a substantially L-shaped carriage member vertically slidable on each standard, each carriage member comprising a vertical arm disposed parallel with and closely adjacent the said flange on the corresponding standard, and an anti-friction roller carried by the vertical arm of each carriage member and engaging the inner face of the flange of the corresponding standard so as to prevent movement of the upper end of the vertical arm of each carriage member away from its standard, a bracket arm carried by each carriage member adjacent the forward end of the horizontal arm of the carriage member and shaped to extend about the edges of the flange of the corresponding standard to prevent movement of the said horizontal arm in each carriage away from its standard, and an anti-friction roller carried by the bracket arm on each carriage member and in engagement with the outer face of the adjacent flange on the corresponding standard so as to prevent movement of each horizontal arm toward its standard, the roller at the upper end of each vertical arm of the carriage member, and the bracket arm and roller at the forward end of each of the horizontal arms on the carriage members coöperating to maintain the carriage members in proper relation to the standards while permitting vertical movement thereof.

In testimony whereof I affix my signature in presence of two witnesses.

AL C. KLEMME.

Witnesses:
G. E. LAU,
E. L. BLEAN.